(12) United States Patent
Givot

(10) Patent No.: US 11,526,942 B2
(45) Date of Patent: Dec. 13, 2022

(54) SYSTEM AND METHOD FOR ENHANCED ELECTRONIC NETWORKED SETTLEMENT PROCESSOR

(71) Applicant: NYSE Chicago, Inc., Chicago, IL (US)

(72) Inventor: Steven I. Givot, Chicago, IL (US)

(73) Assignee: NYSE Chicago, Inc., Chicago, IL (US)

( * ) Notice: Subject to any disclaimer, the term of this patent is extended or adjusted under 35 U.S.C. 154(b) by 0 days.

(21) Appl. No.: 17/465,353

(22) Filed: Sep. 2, 2021

(65) Prior Publication Data

US 2021/0398216 A1 Dec. 23, 2021

Related U.S. Application Data

(60) Continuation of application No. 17/183,711, filed on Feb. 24, 2021, now Pat. No. 11,170,441, which is a division of application No. 16/742,159, filed on Jan. 14, 2020, now Pat. No. 10,970,783, which is a continuation of application No. 15/072,950, filed on Mar. 17, 2016, now Pat. No. 10,565,649.

(60) Provisional application No. 62/134,885, filed on Mar. 18, 2015.

(51) Int. Cl.
*G06Q 40/04* (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | |
|---|---|---|
| 2002/0035531 A1 | 3/2002 | Push |
| 2003/0229569 A1 | 12/2003 | Nalbandian et al. |
| 2004/0117284 A1 | 6/2004 | Speth |

*Primary Examiner* — Joseph W. King
(74) *Attorney, Agent, or Firm* — DLA Piper LLP (US)

(57) ABSTRACT

A system and method are provided for settlement and delivery of cash settled futures contracts overlying open-ended mutual fund shares with optional delivery of mutual fund shares when physical settlement is elected. On the last date of the contract, a party which has an open position in the contract tenders the clearing organization a request to elect optional physical settlement of a specified number of shares of the mutual fund in additional to the standard cash settlement of those contracts. The clearing organization, upon acceptance and when it is certain of the requestor's final position in the futures contract, it processes the election request against the requestor's final position and possibly submits an order on behalf of the requestor to the investment company which manages the mutual fund to purchase or redeem shares of the open-ended mutual fund in a quantity roughly the size of the requestor's final contract position.

18 Claims, 7 Drawing Sheets

SYSTEM AND METHOD FOR ENHANCED ELECTRONIC NETWORKED SETTLEMENT PROCESSOR

TECHNICAL FIELD

Disclosed herein is a system and method for operating an enhanced electronic networked settlement processing system that improves the efficiency of a settlement process. Specifically, the system and method improves on the processors used for settlement and delivery of cash settled futures contracts by incorporating a processing module that accommodates a physical settlement.

BACKGROUND

The system and method described below relate, in general, to processors utilized in a marketplace for the automated (electronic) or manual trading of Futures Contracts on Open-Ended Mutual Funds (OEMFs) and, more particularly, to a system and method for enhancing processors utilized in the settlement and delivery against such contracts.

In the past two decades, there has been extraordinary growth in both the number of Exchange Traded Funds (ETFs) available for trading and the trading activity in those ETFs. ETFs are governed by the Securities Act of 1933 ("1933 Act"). Closed-end Mutual Funds (CEMFs) are also governed by the 1933 Act. OEMFs are governed by the Investment Company Act of 1940 ("1940 Act").

ETFs offer an attractive investment and trading alternative to OEMFs for several reasons.

First, ETFs and CEMFs trade through the trading day. This permits the purchase or sale price of an ETF or CEMF transaction to be determined at the time of transaction. OEMFs do not trade throughout the trading day.

All transactions in OEMFs are done with the Investment Company that manages the OEMF taking the opposite side of the transaction. OEMF transactions are always priced at the net asset value (NAV) which is calculated by the Investment Company at the end of the trading day. At the end of each business day, the difference between the number of shares of an OEMF that investors (in aggregate) wish to purchase minus the number of shares that investors (in aggregate) wish to redeem (sell) is the net demand for shares in that OEMF. The Investment Company stands ready to purchase or sell a sufficient number of shares in the OEMFs to meet the net demand at the end of each trading day. However, there is no market in shares of OEMFs during trading hours which would permit an investor to establish a known price for a transaction at the time of the transaction.

ETFs and CEMF s trade throughout the trading day. ETF transactions are priced based on supply and demand at the time of the transaction similar to the pricing of transactions in common stocks, preferred stocks, CEMF s, and other equity securities. In the trading of ETFs, there is no party analogous to an Investment Company which always stands ready to purchase or sell ETF shares at a calculated price Second, OEMFs and ETFs can have significantly different cost structures.

There can be considerable distribution charges related to buying or holding a position in a Mutual Fund. These are governed by Section 12b-1 of the 1940 Act. A given OEMF may have several classes of stock—each with its own set of Section 12b-1 distribution charges. As a result, different classes of stock in the same Mutual Fund may have different NAVs. Section 12b-1 distribution charges are paid by the OEMF and, therefore, are borne by the investors in the OEMF. The Section 12b-1 distribution charges are in addition to the Investment Company's fee for managing the OEMF. Section 12b-1 distribution charges can significantly reduce the return on investment in an OEMF.

ETFs have no equivalent to a Section 12b-1 distribution charge since—unlike OEMFs—they are not sold through distribution channels. ETFs do, however, have a management fee similar to that of OEMFs.

Third, unlike ETFs and CEMFs, it is not possible to carry a short position in an OEMF.

There is no provision in the 1940 Act which support establishing or maintaining a short position. The only position that an investor may have in an OEMF is a long position. One cannot sell more shares in an OEMF than one owns. It is not possible to make a short sale of an OEMF because there is no way to borrow shares of the OEMF to deliver against a short sale.

ETF and CEMF shares can be sold short because they can be borrowed and delivered by the party making a short sale. This is an important factor in the trading of ETFs because it provides an arbitrage mechanism to assure that the market price of ETFs tracks the NAV of the ETF. To assure that ETF shares will track the NAV of the ETF, ETFs have provisions for certain parties to create or redeem ETF shares by means of swapping the assets underlying the ETF in exchange for ETF shares. This and the ability to sell short promotes and encourages parity between the market price and NAV of the ETF.

These three differences between ETFs and OEMFs described above give rise to a competitive threat that ETFs have made against more traditional investment in OEMFs. However, a more recent product introduction makes that threat even stronger.

The most recent innovation in ETF products has been the introduction of exchange-traded managed funds (ETMFs). Prior to ETMFs, most ETFs were designed to track a specific index or commodity. For example, GLD was designed to track the spot price of gold bullion. SLV was designed to track the spot price of silver bullion. SPY was designed to track the value of the Standard & Poor's 500 index. Inverse ETFs are designed to track of the percentage rate of return of a short position in the underlying index or commodity. Leveraged ETFs are designed to track a multiple of the percentage price movement of an associated commodity or index. Until the introduction of ETMFs, ETFs did not compete directly with OEMFs because they did not offer the allure of having a professional investment manager selecting the components of the fund and attempting to outperform the market.

ETMFs—like OEMFs—are not designed to track a specific commodity or index. They are designed to achieve their investment objective while allowing the ETMF manager the flexibility to determine which financial instruments are included in the ETMF, the investment mix in the various the financial instruments held by the ETMF, and whether long or short positions are held in various financial instruments. In this regard, ETMFs are much more like OEMFs and pose a direct competitive threat on the ability of OEMFs to compete for investment dollars.

On top of the three historical differences between ETFs and OEMFs described above, active management of ETFs poses an immediate competitive threat to traditional OEMFs and the Investment Companies which offer them.

The systems and methods described herein level the playing field between ETFs (and ETMFs, in particular) and OEMFs.

Definitions & Acronyms

The following definitions and acronyms are utilized in the following description.

| | |
|---|---|
| 1933 Act | The Securities Act of 1933. |
| 1934 Act | The Securities Exchange Act of 1934. |
| 1938 Act | The Commodity Exchange Act of 1938. |
| 1940 Act | The Investment Company Act of 1940. |
| Clearing Member | An organization which carries the accounts of Holders and Writers of OEMF Futures Contracts and is a participant in the Clearing Organization which clears those OEMF Futures Contracts. |
| Clearing Organization | An organization which records, maintains, margins, and effects delivery and settlement against long and short positions in a financial instrument such as an OEMF Futures Contract or an OEMF Option Contract. Clearing Organizations typically serve as intermediaries between buyers and sellers so that (after the initial transaction) the buyer and the seller are no longer directly bound to each other in the contract and guarantee performance under such contracts. |
| CEMF (Closed-Ended Mutual Fund) | A Mutual Fund with a fixed number of shares. Unlike OEMFs, may be listed and traded on a national securities exchange which is registered under the 1934 Act. |
| Cutoff Date to Elect Optional Physical Settlement | The date on which the Cutoff Time to Elect Optional Physical Settlement occurs. |
| Cutoff Time to Elect Optional Physical Settlement | The Clearing Organization will set a cutoff time to elect option physical settlement of each OEMF Futures Contract. The Clearing Organization member representing the Holder of a long position or Writer of a short position in OEMF Futures Contracts must provide the Clearing Organization notice of election for optional physical settlement prior to this time. The Clearing Organization will set this time sufficiently prior to the Investment Company's cutoff time to submit orders to purchase or redeem OEMF shares through the optional physical delivery mechanism so that the Clearing Organization can submit such orders to the Investment Company in a timely manner. |
| ETF (Exchange Traded Fund) | A member of an asset class which is listed under the 1933 Act and traded on a national securities exchange which is registered under the 1934 Act. |
| ETMF (Exchange Traded Managed Fund) | An exchange-traded fund with a manager making decisions on the underlying portfolio allocation or otherwise not following a passive investment strategy. Although an ETMF will have a benchmark index, managers may change sector allocations, market-time trades or deviate from the index as they see fit, thereby producing investment returns that will not perfectly mirror the underlying index. |
| Futures Contract | Typically, a contract calling for delivery of a specified quantity of an asset or cash at a specified future date. Futures Contracts trade on an exchange established under the 1938 Act. For the purpose of this document, this term shall also include Forward Contracts which are traded over-the-counter. |
| Holder | A party which has a long position in an OEMF Futures Contract or OEMF Option Contract. |
| Investment Company | A company formed under and operating under the Investment Company Act of 1940. Investment Companies manage and offer Mutual Funds. |
| Mutual Fund | A security created by an Investment Company under the 1940 Act. |
| NAV (Net Asset Value) | The value of a mutual fund that is reached by deducting the fund's liabilities from the market value of all of its shares and then dividing by the number of issued shares. |
| OEMF (Open-Ended Mutual Fund) | A Mutual Fund which can have a variable number of shares created or destroyed based on supply and demand. OEMFs cannot be listed or traded on a national securities exchange under the 1934 Act. |
| OEMF Futures Cash Settlement | Final cash settlement of the terms of an OEMF Futures Contract by means a cash payment between Holders and Writers in OEMF Futures Contracts. OEMF Futures Cash Settlement is effected by the Clearing Organization which records all long and short positions. All OEMF Futures Contracts employ final cash settlement at the OEMF Futures Cash Settlement Price which is the same as the OEMF Futures Physical Settlement Price. |
| OEMF Futures Cash Settlement Price | The OEMF Futures Cash Settlement Price is determined for a given OEMF Futures Contract. The OEMF Futures Cash Settlement Price is the same as the OEMF Futures Physical Settlement Price for the same the OEMF Futures Contract. |
| OEMF Futures Contract | A Futures Contract which calls for delivery of cash based on the NAV of the OEMF as well as the optional purchase or redemption of OEMF shares at the NAV on the OEMF Futures Cash Settlement Date. |
| OEMF Futures Physical Settlement | An optional settlement feature of OEMF Futures Contracts which can be independently elected by Holders and Writers of OEMF Futures Contracts in addition to the mandatory OEMF Futures Cash Settlement. Prior to the OEMF Futures Physical Settlement Notice Deadline, the Holder or Writer of a position in OEMF Futures Contracts can notify the Clearing Organization of the election to employ the OEMF Futures Physical Settlement feature. If elected by a Holder of one or more OEMF Futures Contracts, the Clearing Organization will submit an order for the Holder to purchase the corresponding number of shares of the underlying OEMF from the Investment Company at the NAV on |

| | |
|---|---|
| | the OEMF Last Trading Date. If elected by a Writer of one or more OEMF Futures Contracts, the Clearing Organization will submit an order for the Writer to redeem the corresponding number of shares of the underlying OEMF to the Investment Company at the NAV on the OEMF Last Trading Date. Holders and Writers may elect optional OEMF Futures Physical Settlement for some or all of their OEMF Futures position. |
| OEMF Futures Physical Settlement Price | The OEMF Futures Physical Settlement Price is the NAV of the OEMF shares at the time at which the optional physical settlement of OEMF Futures Contract takes place. Depending on the embodiment of this business method, this price will most commonly be based on either the opening prices of the components of the OEMF shares or the closing prices of the components of the OEMF shares applying the NAV calculation methodology described above. |
| OEMF Futures Physical Settlement Notice Deadline | The last time at which the Clearing Organization will accept notice from the Holder or Writer of an OEMF Futures Contract to elect the optional OEMF Futures Physical Settlement of some or all of the Holder or Writers OEMF Futures Contract position. The Clearing Organization will set this time so that there is sufficient time to inform the Investment Company that a purchase or redemption will take place based exercising the optional OEMF Futures Physical Settlement process. |
| OEMF Last Trading Date | The last date on which an OEMF Futures Contract is scheduled to be available for trading. |
| Writer | A party that has a short position in an OEMF Futures Contract or an OEMF Option Contract. |

SUMMARY

A system and method are described below for settlement and delivery against OEMF Futures Contracts which support the creation of a marketplace for intraday trading in Futures Contracts overlying OEMFs and which can result in the purchase or redemption of OEMF shares. Although CEMF shares can be listed and traded on a national securities exchange, there is no provision in the law which permits listing and trading of OEMF shares on a national securities exchange to provide an intraday trading market in OEMF shares. The proposed marketplace for intraday trading in OEMF Futures Contracts employs known techniques utilized to support intraday trading of other Futures Contracts. The present disclosure provides a system and method to settle OEMF Futures Contracts with an option OEMF Futures Physical Settlement in addition to the mandatory cash settlement features of OEMF Futures Contracts.

The services of a Clearing Organization are required to provide support for intraday trading in any Futures Contract. These include services such as transaction settlement, recording and recordkeeping related to all open positions, margining open positions, delivery, and settlement. The Clearing Organization for the presently described system provides a new, optional delivery and settlement system and method: OEMF Futures Physical Settlement. This optional delivery and settlement system and method are the focus herein.

In an embodiment of the present invention discussed this document, OEMF Futures Contracts would be based on the value of, e.g., 100 shares of the underlying OEMF and would be quoted and trade in increments of $0.01 per share.

All OEMF Futures Contracts have a mandatory cash settlement feature which values the OEMF Futures Contract at 100 times the NAV of the underlying OEMF as calculated by the Investment Company at the close of business on the OEMF Futures Last Trading Date.

In addition, Holders and Writers (collectively "owners") of OEMF Futures Contracts—acting independent of each other—may elect to also have a physical settlement (purchase or redemption) of the underlying OEMF for some of all of their OEMF Futures Contracts. If a Holder (Writer) of an OEMF Futures Contracts also elects physical settlement of the OEMF Futures Contract, the Clearing Organization would initiate a transaction between the Holder (Writer) and the Investment Company wherein the Holder (Writer) purchases (redeems) 100 shares of the underlying OEMF from (with) the Investment Company at the NAV price calculated by the Investment Company at the close of business on the OEMF Futures Last Trading Date.

A feature is the ability to establish a price for the purchase or redemption of OEMF shares by entering into an intraday transaction with a party other than the Investment Company. Furthermore, if the transaction leads to the purchase of OEMF shares, the shares purchased will be in a class of OEMF shares for which there will be no Section 12b-1 distribution charges.

In an implementation of the invention, a method is provided for operating an enhanced electronic networked settlement processing system, comprising providing a clearing organization having a computer system processor, memory, and a communications network interface, creating and storing open ended mutual fund (OEMF) data related to an OEMF in a memory communicatively coupled with the network interface of the clearing organization, the stored OEMF data structured to comprise data related to fund assets and a plurality of fund shares having a value related to the fund assets, creating and storing OEMF futures contract (FC) data related to an OEMF FC in the memory by an owner who is a writer or a holder, the OEMF FC data for the OEM FC covering: a) a plurality of contract shares of the fund shares, which constitutes a contract size; b) a contract settlement date; and c) contract settlement terms, utilizing a processor of the clearing organization to execute instructions of a settlement module, comprising if a current date is the contract settlement date, then setting today's contract share value to be equal to the OEMF net asset value (NAV) that is calculated by deducting the OEMF's liabilities from its assets and dividing by a number of the OEMF's issued shares at a time specified in the contract terms, otherwise, if a current date is not the contract settlement date, then setting today's contract share value to be equal to a daily settlement price, calculating a share value change as a difference between today's contract share value and a prior day's share value for an OEMF share, for each long position OEMF FC in each account increasing a cash balance in that account by the contract size times the share value change, for each short OEMF FC in each account decreasing a cash balance in that account by the contract size times the share value change, if a current date is the contract settlement date, then for each long position OEMF FC in each account, reducing the long position by one futures contract, for each short OEMF FC in each account, reducing the long position by one futures contract, sending a message over the communications network by a clearing member computer associated with the account to a server computer of a clearing organization requesting an election for an optional OEMF FC physical settlement (PS) of a requested number of shares to be exchanged, utilizing a processor of the clearing organization to execute instructions of a physical settlement request module, comprising if the message is untimely, then sending a message by the clearing organization over the communications network rejecting the election request and terminating the request, otherwise, if the message is timely, then accepting the election request which supersedes any prior election request for the same OEMF FC for the account of the owner, and utilizing a processor of the clearing organization to execute instructions of a physical settlement module, comprising if the owner's final position is improper, then ignoring the election request by the server computer of the clearing organization and terminating the election request, terminating execution of the physical settlement module, otherwise, if the owner's final position is proper, then reducing a size of the owner's position to a lesser of a requested and current position computing a final maximum number of shares that the OEMF FC PS may handle as the number of OEMF shares covered by the owner's final position in the OEMF FC, sending, by the clearing organization, an order to redeem the final number of shares to the investment company at the current date's OEMF NAV on behalf of the owner's account, and sending, by the clearing organization, information to the clearing member regarding the order to redeem.

In another implementation of the invention, a system is provided for operating an enhanced electronic networked settlement process, comprising a computer system processor, a memory a communications network interface, a settlement module comprising instructions stored in the memory and executable by the processor, a physical settlement request module comprising instructions stored in the memory and executable by the processor, and a physical settlement module, wherein the settlement module comprises instructions that create and store open ended mutual fund (OEMF) data related to an OEMF in the memory communicatively coupled with a network interface of a clearing organization, the stored OEMF data structured to comprise data related to fund assets and a plurality of fund shares having a value related to the fund assets, create and storing OEMF futures contract (FC) data related to an OEMF FC in the memory by an owner who is a writer or a holder, the OEMF FC data for the OEM FC covering: a) a plurality of contract shares of the fund shares; b) a contract settlement date; and c) contract settlement terms, utilize a processor of the clearing organization to execute instructions of a settlement module, comprising if a current date is the contract settlement date, then set today's contract share value to be equal to the OEMF net asset value (NAV) that is calculated by deducting the OEMF's liabilities from its assets and dividing by a number of the OEMF's issued shares at the time specified in the contract terms, otherwise, if a current date is not the contract settlement date, then set today's contract share value to be equal to a daily settlement price, calculate a share value change as a difference between today's contract share value and a prior day's last share value for an OEMF share, for each long position OEMF FC in each account increase a cash balance in that account by the contract size times the share value change, for each short OEMF FC in each account decrease a cash balance in that account by the contract size times the share value change, if a current date is the contract settlement date, then for each long position OEMF FC in each account, reduce the long position by one futures contract, for each short OEMF FC in each account, reduce the long position by one futures contract, send a message over the communications network by a clearing member computer associated with the account to a server computer of a clearing organization requesting an election for an optional OEMF FC physical settlement (PS) of a requested number of shares to be exchanged, utilize a processor of the clearing organization to execute instructions of a physical settlement request module, comprising if the message is untimely, then the instructions send a message by the clearing organization over the communications network rejecting the election request and terminate the request, otherwise, if the message is timely, then the instructions accept the election request which supersedes any prior election request for the same OEMF FC for the account of the owner, utilize a processor of the clearing organization to execute instructions of a physical settlement module, comprising if the owner's final position is improper, then the instructions ignore the election request by the server computer of the clearing organization and terminating the election request, and terminate execution of the physical settlement module, otherwise, if the owner's final position is proper, then reduce a size of the owner's position to a lesser of a requested and current position compute a final maximum number of shares that the OEMF FC PS may handle as the number of OEMF shares covered by the owner's final position in the OEMF FC, send, by the clearing organization, an order to redeem the final number of shares to the investment company at the current date's OEMF NAV on behalf of the owner's account, and send, by the clearing organization, information to the clearing member regarding the order to redeem.

DESCRIPTION OF THE DRAWINGS

For a more complete understanding of the system and method described herein, and for further features and advantages, reference is now made to the following descriptions, taken in conjunction with the accompanying drawings which include.

DETAILED DESCRIPTION

Figure 1A:
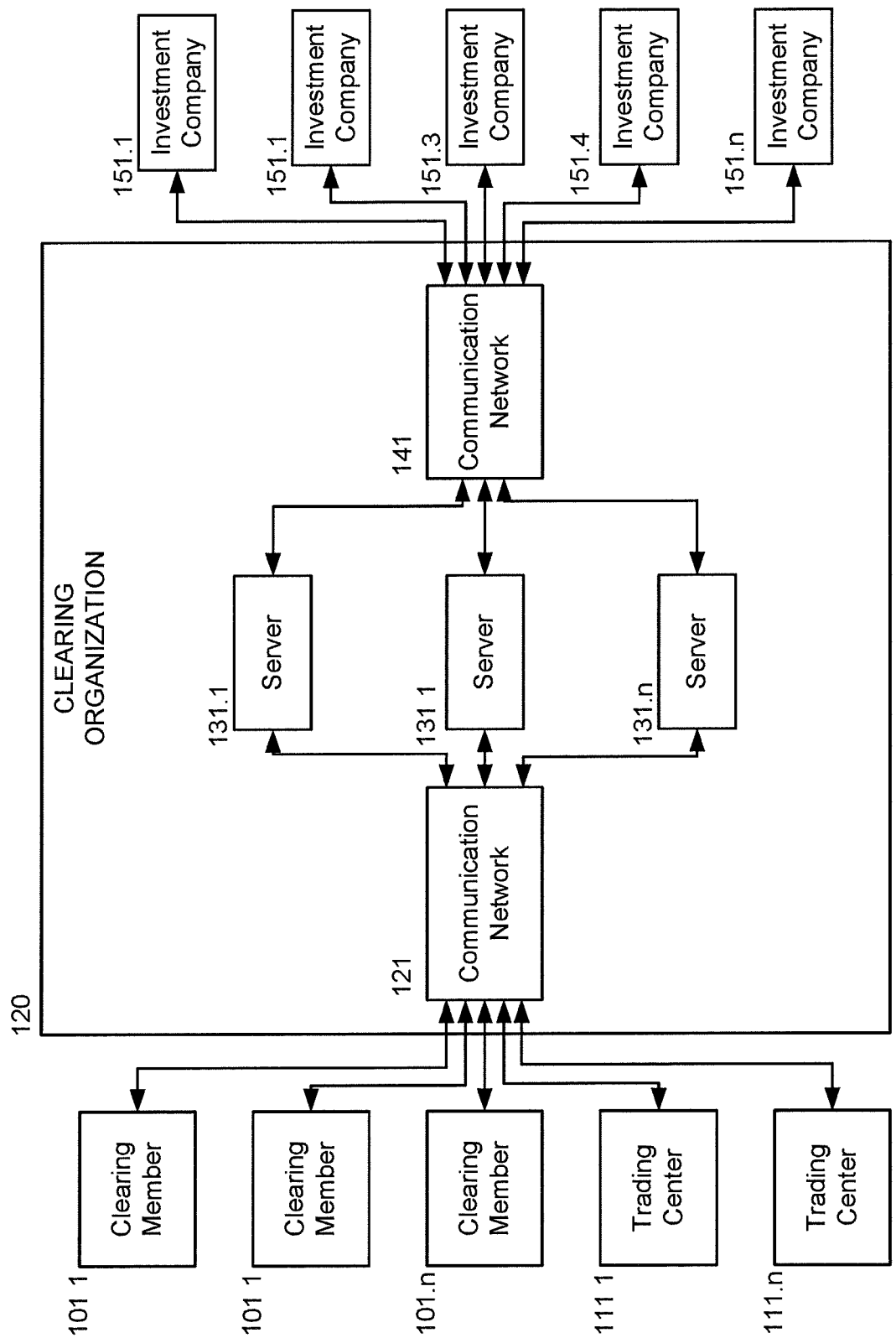
FIG. 1A is a block diagram illustrating example computer systems and networks that may be used for the option OEMF Futures Physical Settlement Processor.

FIG. 1A shows one embodiment of computers and networks (equipment) which could be used to process OEMF Futures Contract Physical Settlements. This figure illustrates a configuration of Clearing Organization computer systems which are connected over various networks to (1) Clearing Members who are registered and approved by the Clearing Organization to maintain one or more accounts with the Clearing Organization and (2) Investment Companies which manage one or more Mutual Funds with underlying OEMF Futures Contracts.

Systems operated by Clearing Members (101.1 ... 101.n, or collectively/example 101) are connected to the Clearing Organization 120 through a Communication Network 121 operated by the Clearing Organization. Clearing Member systems are used—among other things—to send the Clearing Organization messages requesting election of OEMF Futures Contract Physical Settlement for accounts which the Clearing Member carries; to receive responses to messages requesting election of OEMF Futures Contract Physical Settlement; and to receive notification of orders submitted by the Clearing Organization to Investment Companies which manage OEMFs to purchase or redeem OEMF Shares thereby implementing OEMF Futures Contract Physical Settlement.

Systems operated by Trading Centers offering trading in OEMF Futures Contracts (111.1 ... 111.n, collectively/example 111) are connected to the Clearing Organization 120 through a Communication Network 121 operated by the Clearing Organization. Trading Center systems provide the Clearing Organization with transaction reports which are used by the Clearing Organization to monitor the positions of each trading account at each Clearing Member in real time. Real time position information for each trading account at each Clearing Member is valuable to the operation.

Servers (131.1 ... 131.n, collectively/example 131) are operated by the Clearing Organization. These servers receive all messages from Clearing Member systems and Trading Center Systems through the Clearing Organization's Communication Network 121. These servers process those messages for the Clearing Organization.

Systems (151.1 ... 151.n, collectively/example 151) are operated by Investment Companies which manage the OEMFs which underlie the OEMF Futures Contracts. Investment Company systems and the Clearing Organization communicate with each other through a Communications Network 141. Investment Company systems are used—among other things—to send the Clearing Organization periodic, real time calculations of the NAV of each OEMF which underlies the trading of OEMF Futures Contracts; receive orders to purchase or redeem OEMF shares as part of the OEMF Futures Physical Settlement process; and confirm receipt, execution, and/or cancellation of orders to purchase or redeem OEMF shares as part of the OEMF Futures Physical Settlement process.

Figure 1B:
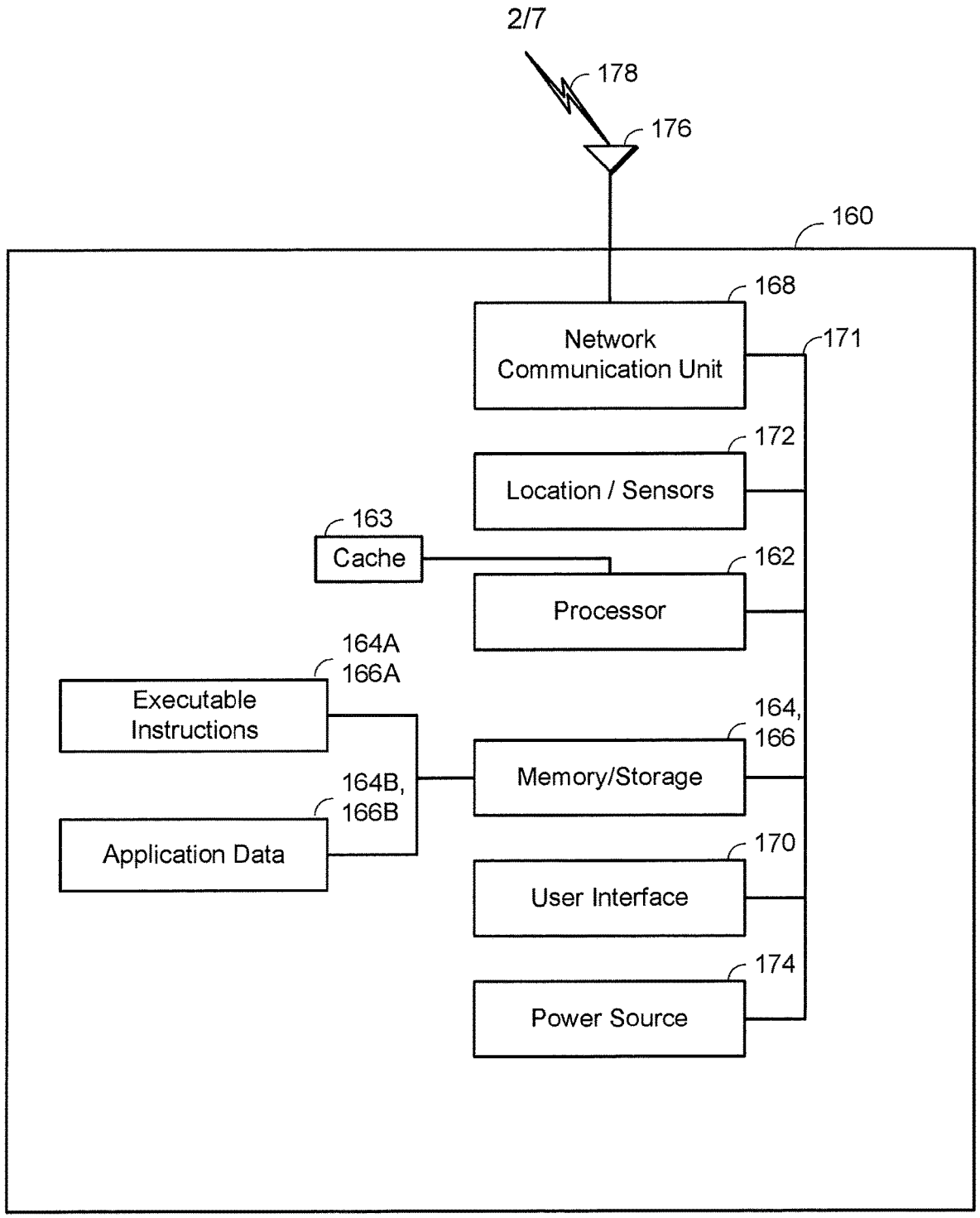
FIG. 1B is a block diagram of an example computer that may be utilized in the system.

FIG. 1B is a block diagram of an example internal configuration of a computing device 200, such as the server 131 shown in FIG. 1A, or client/server computers within the clearing member 101, trading center 111, or investment companies 151 shown in FIG. 1A. Any of these computers may take the form of a computing system including multiple computing units, or in the form of a single computing unit, for example, a mobile phone, a tablet computer, a laptop computer, a notebook computer, a desktop computer, a server computer and the like.

The computing device 160 can include a number of components, as illustrated in FIG. 1B. CPU (or processor) 162 can be a central processing unit, such as a microprocessor, and can include single or multiple processors, each having single or multiple processing cores. Alternatively, CPU 162 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 162 can be distributed across multiple machines that can be coupled directly or across a local area or other network The CPU 162 can be a general purpose processor or a special purpose processor.

Random Access Memory (RAM 164) can be any suitable non-permanent storage device that is used as memory. RAM 164 can include executable instructions and data for immediate access by CPU 162. RAM 164 typically comprises one or more DRAM modules such as DDR SDRAM. Alternatively, RAM 164 can include another type of device, or multiple devices, capable of storing data for processing by CPU 162 now-existing or hereafter developed. CPU 162 can access and manipulate data in RAM 164 via bus 171. The CPU 162 may utilize a cache 163 as a form of localized fast memory for operating on data and instructions.

Storage 166 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 166 can include executable instructions 166A and application files/data 166B along with other data. The executable instructions 166A can include, for example, an operating system and one or more application programs for loading in whole or part into RAM 164 (with RAM-based executable instructions 164A and application files/data 164B) and to be executed by CPU 162. The executable instructions 166A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional implementations of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 166B can, for example, include user files, database catalogs and configuration information. In an implementation, storage 166 includes instructions to perform the discovery techniques described herein. Storage 166 may comprise one or multiple devices and may utilize one or more types of storage, such as solid state or magnetic.

The computing device 160 can also include one or more input/output devices, such as a network communication unit 168 and interface 176 that may have a wired communication component or a wireless communications component 178, which can be coupled to CPU 162 via bus 171. The network communication unit 168 can utilized any of a variety of standardized network protocols, such as Ethernet, TCP/IP, to name a few of many protocols, to effect communications between devices. The interface 176 can comprise one or more transceiver(s) that utilize the Ethernet, power line communication (PLC), Wi-Fi, infrared, GPRS/GSM, CDMA, etc.

A user interface 170 can include a display, positional input device (such as a mouse, touchpad, touchscreen, or the like), keyboard, or other forms of user input and output devices. The user interface 170 can be coupled to the processor 162 via the bus 171. A graphical user interface (GUI) 170 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 160 are also possible. For example, servers may omit display 170. RAM 164 or storage 166 can be distributed across multiple machines such as network-based memory or memory in multiple machines performing the operations of clients or servers. Although depicted here as a single bus, bus 171 can be composed of multiple buses, that may be connected to each other through various bridges, controllers, and/or adapters. Computing devices 160 may contain any number of sensors and detectors that monitor the device 160 itself or the environment around the device 160, or it may contain a location identification unit 172, such as a GPS or other type of location device. The computing device 160 may also contain a power source 174, such as a battery, so that the unit can operate in a self-contained manner. These may communicate with the CPU/processor 162 via the bus 171.

Figure 2:
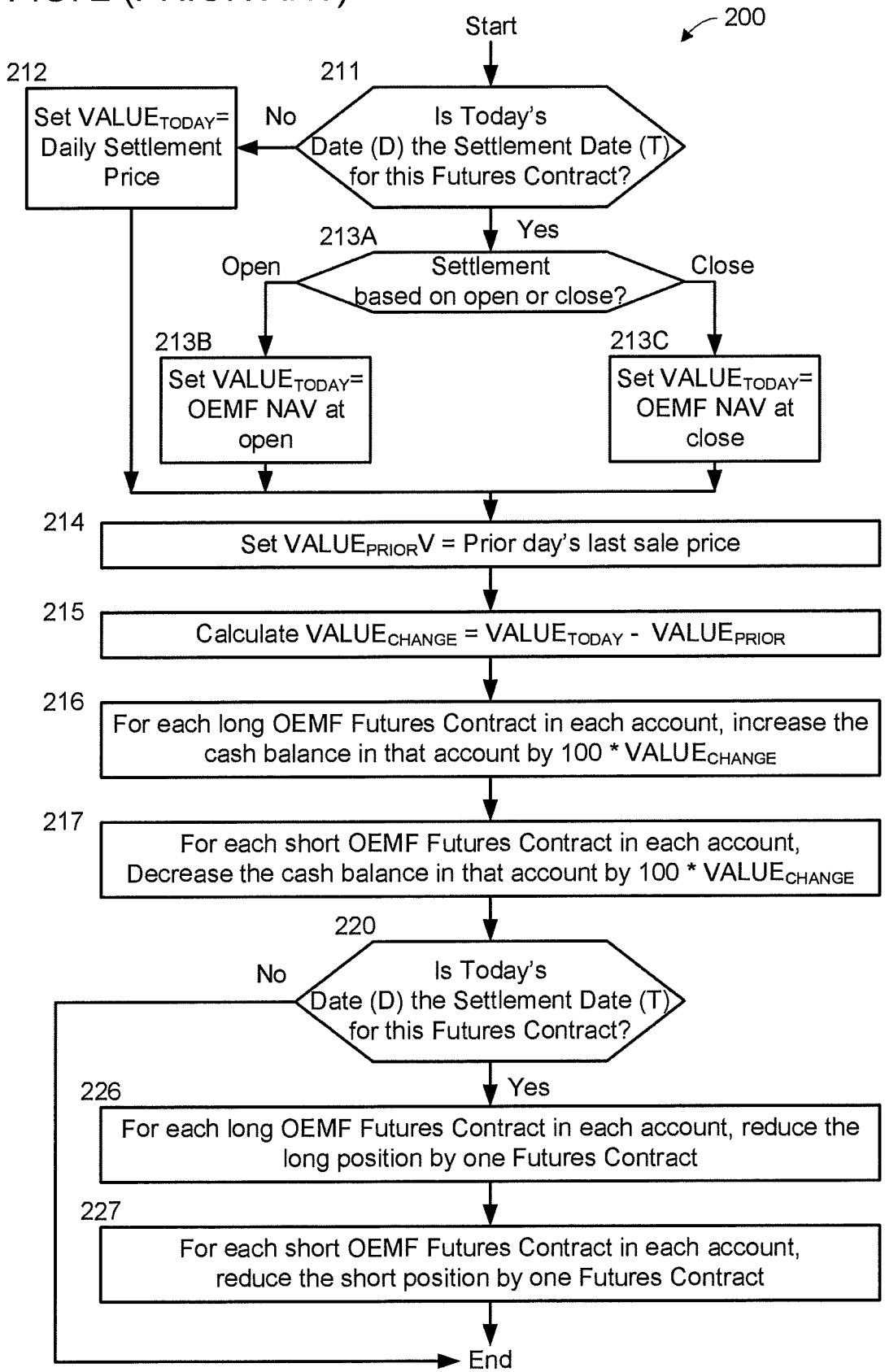
FIG. 2 is a flowchart that shows the mandatory state of the art method employed by the Clearing Organization for handling the OEMF Futures Cash Settlement which occurs after the close of trading on the OEMF Last Trading Date.

FIG. 2 shows the mandatory state of the art method employed by the Clearing Organization for the OEMF Futures Cash Settlement which typically is based on either the closing prices on the OEMF Last Trading Date or the opening prices on the next trading date after the OEMF Last Trading Date. The FIG. 2 process is the process performed by a settlement module and is akin to what is used today for cash settlement of Futures Contracts overlying stock index futures. By way of example, consider the cash settlement methodology used to determine the final cash settlement price of a futures contract as shown in FIG. 2. Assume that the final date for trading this contract is T and that the prior trading dates before T are T−1, T−2, T−3, etc. It is customary that futures Clearing Organizations settle daily profits and losses with the loser paying the winner the change in contract last sale price each day up to and including T−1. However, on T, the loser pays the winner the difference between the settlement price on T−1 and the actual value of the underlying at the close of business on T. Assume that the futures contract in this example has a multiplier of 100 that is to say that each change in price of 1.00 equates to a $100.00 change in the cash value of the futures contract. The table below shows overnight payments from losers to winners each day. The final payment, which covers the change from T−1 to T comprises the final settlement of the contract.

TABLE 1

| DATE | LAST SALE PRICE OF FUTURES CONTRACT | ACTUAL VALUE OF UNDERLYING | VALUE USED FOR SETTLEMENT | PAYMENT AMOUNT PAID PER CONTACT | WHO PAYS WHOM |
|---|---|---|---|---|---|
| T-4 | 501.50 | 501.26 | 501.50 | — | — |
| T-3 | 506.00 | 506.21 | 506.00 | 450.00 | SHORT pays LONG |
| T-2 | 504.50 | 504.52 | 504.50 | 150.00 | LONG pays SHORT |
| T-1 | 501.00 | 500.96 | 501.00 | 350.00 | LONG pays SHORT |
| T | 500.25 | 500.00 | 500.00 | 100.00 | LONG pays SHORT |

Overnight Payments from Losers to Winners

Similarly, by way of example, consider the cash settlement methodology used to determine the final cash settlement price of a futures contract as shown in FIG. 1B. Assume that the final date for trading this contract is T, that T+1 is the next trading date after T, and that the prior trading dates before T are T−1, T−2, T−3, and T−4. It is customary that futures Clearing Organizations settle daily profits and losses with the loser paying the winner the change in contract last sale price each day up to and including T. However, on T+1, the loser pays the winner the difference between the settlement price on T−1 and the actual value of the underlying at the opening of business on T−1. Assume that the futures contract in this example has a multiplier of 100 that is to say that each change in price of 1.00 equates to a $100.00 change in the cash value of the futures contract. The table below shows overnight payments from losers to winners each day. The final payment, which covers the change from T−1 to T comprises the final settlement of the contract.

At 214, the Clearing Organization 120 sets the VALUE$_{PRIOR}$ as the prior day's settlement price. The Clearing Organization has previously transferred cash between Holders and Writers reflecting all changes in the value of the underlying the Futures Contract to reflect that the value was VALUE$_{PRIOR}$. Therefore, the only additional cash to flow between Holders and Writers will reflect the change in the value underlying the Futures Contract which occurred most recently. Processing continues at 215.

At 215, the Clearing Organization 120 calculates the change in the value underlying the Futures Contract which occurred between the prior trading date and the current trading date to be:

$$VALUE_{CHANGE} = VALUE_{TODAY} VALUE_{PRIOR}$$

TABLE 2

| DATE | LAST SALE PRICE OF FUTURES CONTRACT | ACTUAL VALUE OF UNDERLYING | VALUE USED FOR SETTLEMENT | PAYMENT AMOUNT PAID PER CONTACT | WHO PAYS WHOM |
|---|---|---|---|---|---|
| T−4 | 501.50 | 501.26 | 501.50 | — | — |
| T−3 | 506.00 | 506.21 | 506.00 | 450.00 | SHORT pays LONG |
| T−2 | 504.50 | 504.52 | 504.50 | 150.00 | LONG pays SHORT |
| T−1 | 501.00 | 500.96 | 501.00 | 350.00 | LONG pays SHORT |
| T | 500.25 | 500.00 | 500.25 | 75.00 | LONG pays SHORT |
| T + 1 | — | 502.50 | 502.50 | 250.00 | SHORT pays LONG |

Overnight Payments from Losers to Winners

On T+1, the final value for settlement is the actual value of the underlying based on opening prices.

Referring back to the flowchart shown in FIG. 2, the mandatory state of the art method employed by the Clearing Organization for the OEMF Futures Cash Settlement 200 begins after the close of trading on the OEMF Last Trading Date of the Futures Contract or after the opening on the next trading day, when the final settlement price of the value underlying the Futures Contract is known by the Clearing Organization.

At 211, the Clearing Organization 120 determines whether the Today's Date D is this futures contract's last trading date T. If so 211: Yes, processing continues at 213A. Otherwise 211: No, processing continues at 212.

At 212, the Clearing Organization 120 sets the current day's settlement price VALUE$_{TODAY}$ as the current day's Daily Settlement Price (DSP) of the OEMF futures contract. This DSP is determined as being: 1) the Last or Bid price if Bid>Last, or 2) Last or Ask price if Ask<Last. Processing continues at 214.

At 213A, the Clearing Organization 120 determines whether the terms of the Futures Contract are based on an Open or Closing time. If Open 213A: Open, then the Clearing Organization 120 sets the final settlement price VALUE$_{TODAY}$ as the current day's OEMF's NAV at the open 213B. If Close 213A: Close, then the Clearing Organization 120 sets the final settlement price VALUE$_{TODAY}$ as the current day's OEMF's NAV at the close Close 213C. Processing continues at 214.

Processing continues at 216.

At 216, for each long OEMF Futures Contract in each account held by the Clearing Organization 120, the cash balance in the account is adjusted by 100 (or the appropriate multiplier/contract count) times the VALUE$_{CHANGE}$ to reflect the change for each long OEMF Futures Contract in the account. If VALUE$_{CHANGE}$ is greater than zero—reflecting an increase in the value of the OEMF Futures Contract from the prior trading day, then the cash balance in the account will be increased. If VALUE$_{CHANGE}$ is less than zero—reflecting a reduction in the value of the OEMF Futures Contract from the prior trading day, then the cash balance in the account will be decreased. If VALUE$_{CHANGE}$ equals zero—reflecting no change in the value of the OEMF Futures Contract from the prior trading day, then the cash balance in the accounts will not change. Processing continues at 217.

At 217, for each short OEMF Futures Contract in each account held by the Clearing Organization 120, the cash balance in the account is adjusted by 100 (or the appropriate multiplier/contract count) times VALUE$_{CHANGE}$ to reflect the change for each short OEMF Futures Contract in the account. If VALUE$_{CHANGE}$ is greater than zero—reflecting an increase in the value of the OEMF Futures Contract from the prior trading day, then the cash balance in the account will be decreased. If VALUE$_{CHANGE}$ is less than zero—reflecting a reduction in the value of the OEMF Futures Contract from the prior trading day, then the cash balance in the account will be increased. If VALUE$_{CHANGE}$ equals zero—reflecting no change the value of the OEMF Futures Contract from the prior trading day, then the cash balance in the account will not change. Processing continues at 220.

At 220, the Clearing Organization 120 again determines if Today's date D is the Settlement Date T of the Futures Contract. If not 220: No, then the process 200 ends. If so 220: Yes, then at 226, for each long OEMF Futures Contract in each account, the Clearing Organization 120 reduces the long position by one Futures Contract. Processing continues at 227.

At 227, the Clearing Organization 120 for each short OEMF Futures Contract in each account, the Clearing Organization 120 reduces the short position by one Futures Contract.

This completes the Clearing Organization's processing of the OEMF Futures Contract Cash Settlement on the OEMF Last Trading Date.

Figure 3:
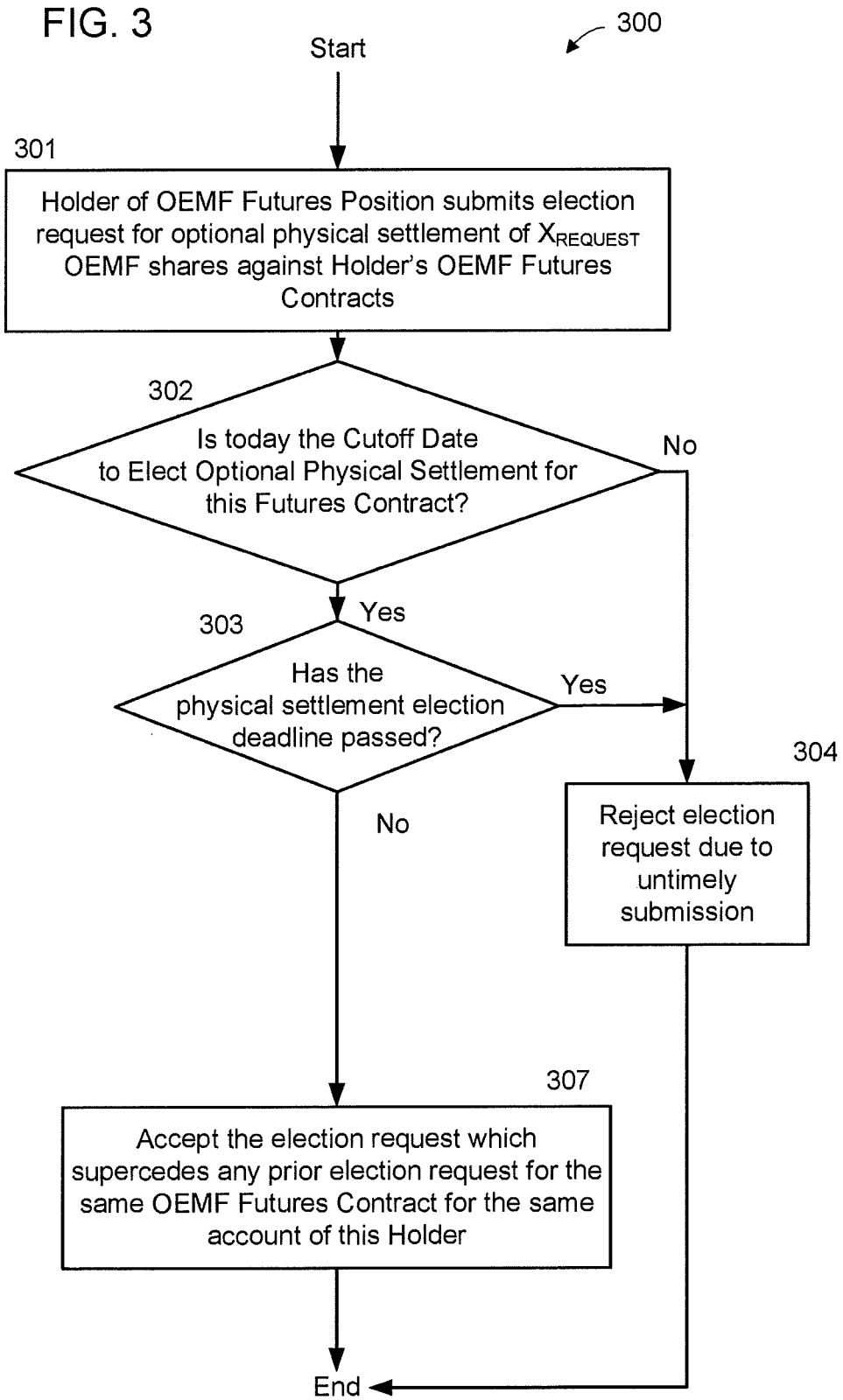
FIG. 3 is a flowchart showing the method and process by which the Holder of an OEMF Futures Contracts may independently request the Clearing Organization to execute the optional OEMF Futures Physical Settlement prior to the Cutoff Time to Elect Optional Physical Settlement on the OEMF Last Trading Date.

FIG. 3 illustrates the process 300 of a physical settlement request module and is an election request for optional OEMF Futures Physical Settlement on receipt of that election request from a Holder of a long position in OEMF Futures Contracts and shows the method and process by which the Holder of an OEMF Futures Contracts may independently request the Clearing Organization to execute the optional OEMF Futures Physical Settlement prior to the Cutoff Time to Elect Optional Physical Settlement on the Cutoff Date to Elect Optional Physical Settlement. This process is the prerequisite to the Clearing Organization executing the optional OEMF Futures Physical Settlement prior to the Cutoff Time to Elect Optional Physical Settlement on the Cutoff Date to Elect Optional Physical Settlement.

This process begins when a Clearing Member sends a message from its system 101 to a Clearing Organization system 131 through the Clearing Organization's 120 Communication Network 121. The election request message identifies the requesting Clearing Member, the account for which the request is being made, the OEMF Futures Contract for which the request is being made, and the number of OEMF shares which are requesting optional OEMF Futures Physical Settlement. Processing begins for process 300 where the election request is received.

At 301 the Clearing Organization 120 receives and examines the election request for optional OEMF Futures Physical Settlement. The Clearing Organization notes that the election request involves $X_{REQUEST}$ OEMF shares. The OEMF Futures Physical Settlement process permits the Holder of a long position to purchase 100 shares for each long OEMF Futures Contract held at the close of trading on the OEMF Futures Last Trading Date plus an additional oddlot quantity—including fractional OEMF shares (if holding of fractional OEMF shares is supported by the Investment Company which manages the OEMF). The oddlot amount, including any fractional shares, must be less than a 100 share round lot. Processing continues at 302.

At 302 the Clearing Organization 120 determines whether the current date is the Cutoff Date to Elect Optional Physical Settlement for the OEMF Futures Contract which is the subject of the election request. Election requests may only be submitted on the Cutoff Date to Elect Optional Physical Settlement. If the current date is not the Cutoff Date to Elect Optional Physical Settlement 302: No, then the election request is premature, and processing continues at 304. Otherwise 302: Yes, processing continues at 303.

At 303 the Clearing Organization 120 determines whether the OEMF Futures Physical Settlement Deadline has passed. This occurs if the current time is at or after the Cutoff Time to Elect Optional Physical Settlement. If the deadline has passed 303: Yes, then the election request is untimely, and processing continues at 304. Otherwise 303:No, processing continues at 307.

At 304 the election request is untimely; it is either not on the Cutoff Date to Elect Optional Physical Settlement or it has been submitted after the OEMF Futures Physical Settlement Deadline has passed. The Clearing Organization rejects the election request. Rejection of the election request is communicated to the Clearing Member which submitted the election request. This is the end of processing of this election request.

At this point, the Clearing Organization 120 has determined that the election request is for a valid OEMF Futures Contract and has been submitted in a timely manner. Processing continues at 307. Any prior election request from the same Clearing Member 101 on behalf of the same account for the same OEMF Futures Contract will be replaced by this subsequent request. An election request for zero OEMF shares will result in cancelling the prior election request. An election request from the same Clearing Member 101 on behalf of the same account for the same OEMF Futures Contract as a Holder of OEMF Futures Contracts (i.e., someone with a long position in OEMF Futures Contracts) will replace any prior request by the same Clearing Member 101 on behalf of the same account for the same OEMF Futures Contract by a Writer of OEMF Futures Contracts (i.e., someone with a short position in OEMF Futures Contracts). Acceptance of the election request is communicated to the Clearing Member 101 which submitted the election request. This is the end of processing of this election request.

Figure 4:
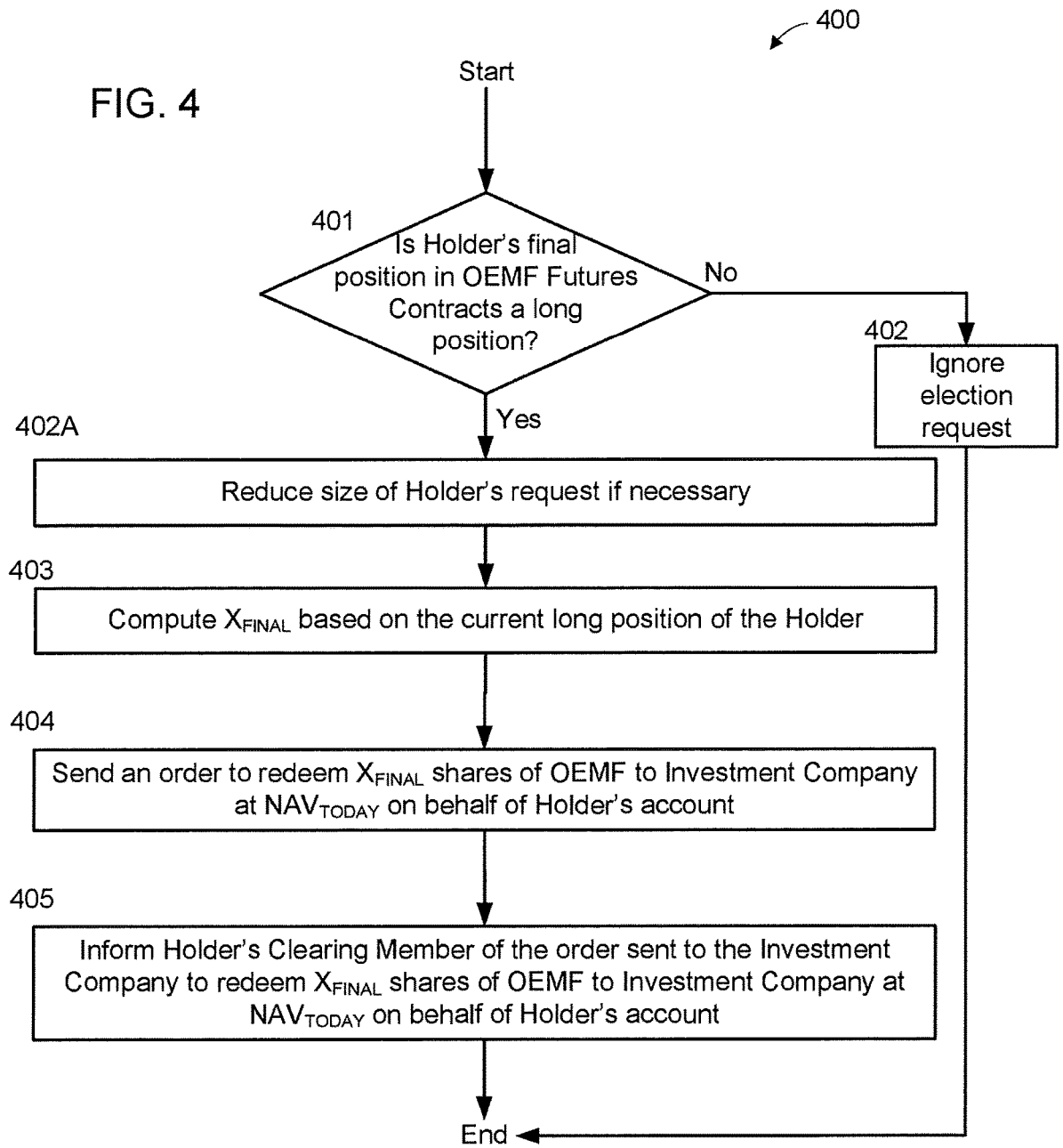
FIG. 4 is a flowchart showing the method and process by which the Clearing Organization processes requests to execute the optional OEMF Futures Physical Settlement after the close of trading in an OEMF Futures Contract on the OEMF Last Trading Date.

FIG. 4 shows the method and process 400 of a physical settlement module by which the Clearing Organization 120 processes requests to execute the optional OEMF Futures Physical Settlement after the Cutoff Time to Elect Optional Physical Settlement on the Cutoff Date to Elect Optional Physical Settlement and illustrates the processing of an election request for optional OEMF Futures Physical Settlement from a Holder of a long position in OEMF Futures Contracts which was previously received and accepted by the Clearing Organization (see FIG. 3). This processing is done after the Cutoff Time to Elect Optional Physical Settlement on the Cutoff Date to Elect Optional Physical Settlement because the Holder's final position is required. The process 400 begins when this condition has been met.

At 401 the Clearing Organization 120 checks to make sure that the Holder which requested OEMF Futures Physical Settlement still has a long position in OEMF Futures Contracts. This was the case when the election request was accepted by the Clearing Organization 120 (see FIG. 3) and must continue to be the case to proceed. If this is still the case (i.e., the Holder's position is at least one) 401:Yes, processing continues at 402A. Otherwise 401:No, processing continues at 402.

At 402 the Holder which requested OEMF Futures Physical Settlement no longer has a long position in OEMF Futures Contracts. OEMF Futures Physical Settlement is not permitted in this case, so the election request is ignored and the Clearing Member 101 is notified that no OEMF Futures Physical Settlement will be effected by the Clearing Organization 120. Processing is now complete.

At 402A, the Holder's request is reduced to the lesser of the request and the current position, which permits the Holder to have physical settlement of all of the Holder's long position even if the current position is less than the request. At 403, the Clearing Organization 120 must now calculate how many OEMF shares should be processed in response to the OEMF Futures Physical Settlement request. The election request provides the number of OEMF shares that the Holder requests be exchanged through the OEMF Futures Physical Settlement process. Assume that this number ($X_{REQUEST}$) is 5463.123. Fractional shares are permitted to the extent that the Investment Company permits ownership of fractional shares. $X_{REQUEST}$ has two components: a mandatory round lot component and an optional odd lot component. The round lot component is an integer multiple 100 shares the number of OEMF shares underlying each OEMF Futures Contract. The odd lot component is an additional number of OEMF shares—less than OEMF 100 shares which, when added to the round lot component, total $X_{REQUEST}$. In the example above, the election request specified a value of $X_{REQUEST}$ of 5463.12 OEMF shares. The round lot component is 5400 OEMF shares (the equivalent of 54 OEMF Futures Contracts) and the odd lot component is 63.12 OEMF shares. The maximum number of shares which the OEMF Futures Physical Settlement process may handle—$X_{FINAL}$—is the number of OEMF shares covered by the Holder's final long position in OEMF Futures Contract—the position at this time—plus the odd lot component. Assuming that $$X_{REQUEST}=5463.12$$

The following table shows $X_{FINAL}$ for various values of the Holder's long position in OEMF Futures Contracts at this time.

TABLE 3

$X_{FINAL}$ for various values of the Holder's long position in OEMF Futures Contracts at this time

| Holder's long position at This Time | $X_{FINAL}$ |
|---|---|
| 58 | 5463.12 |
| 57 | 5463.12 |
| 56 | 5463.12 |
| 55 | 5463.12 |
| 54 | 5463.12 |
| 53 | 5363.12 |
| 52 | 5263.12 |
| 51 | 5163.12 |
| ... | ... |
| 1 | 1.12 |
| 0 | 0 |

$X_{FINAL}$ is calculated in this manner at this point in the process, and processing continues at 404.

At 404 the Clearing Organization 120 sends an order on behalf of the Holder to redeem) (FINAL OEMF shares to the Investment Company 151. The Investment Company 151 will process this order as part of its normal processing of purchase and redemption orders at the end of the trading day when the Investment Company 151 has calculated the current day's NAV for the OEMF shares. The Investment Company 151 will send the final details of the purchase transaction to the Holder's Clearing Member 101 by way of the Clearing Organization 120. Processing continues at 405.

At 405 the Clearing Organization informs the Holder's Clearing Member of the order sent at 404. Processing of submission of the order is complete at this time. The settlement of the transaction shall proceed at another time using state of the art systems and methods already used for this purpose.

Figure 5:
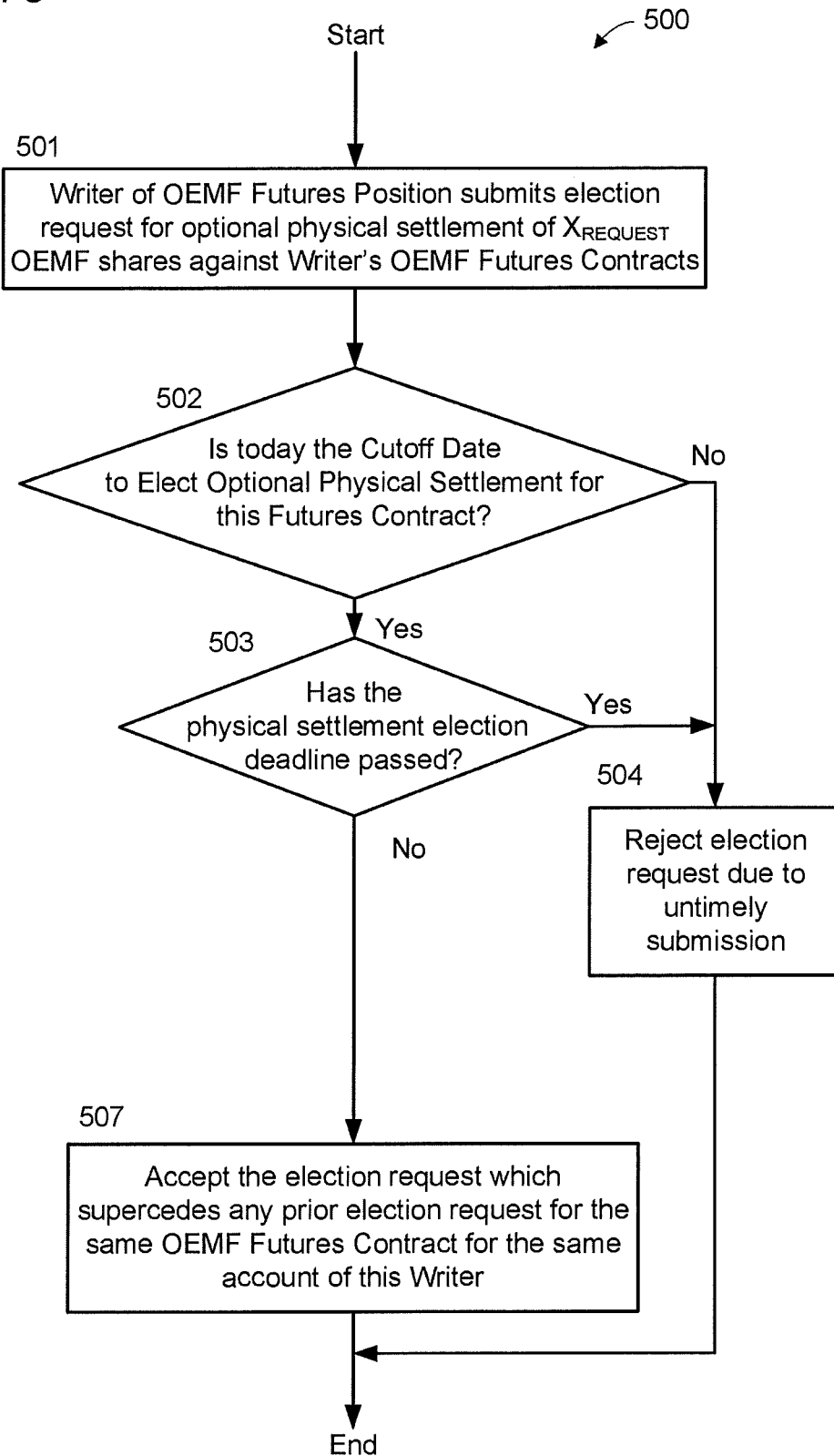
FIG. 5 is a flowchart showing the method and process by which the Writer of an OEMF Futures Contracts may independently request the Clearing Organization to execute the optional OEMF Futures Physical Settlement prior to the Cutoff Time to Elect Optional Physical Settlement on the OEMF Last Trading Date.
Figure 6:
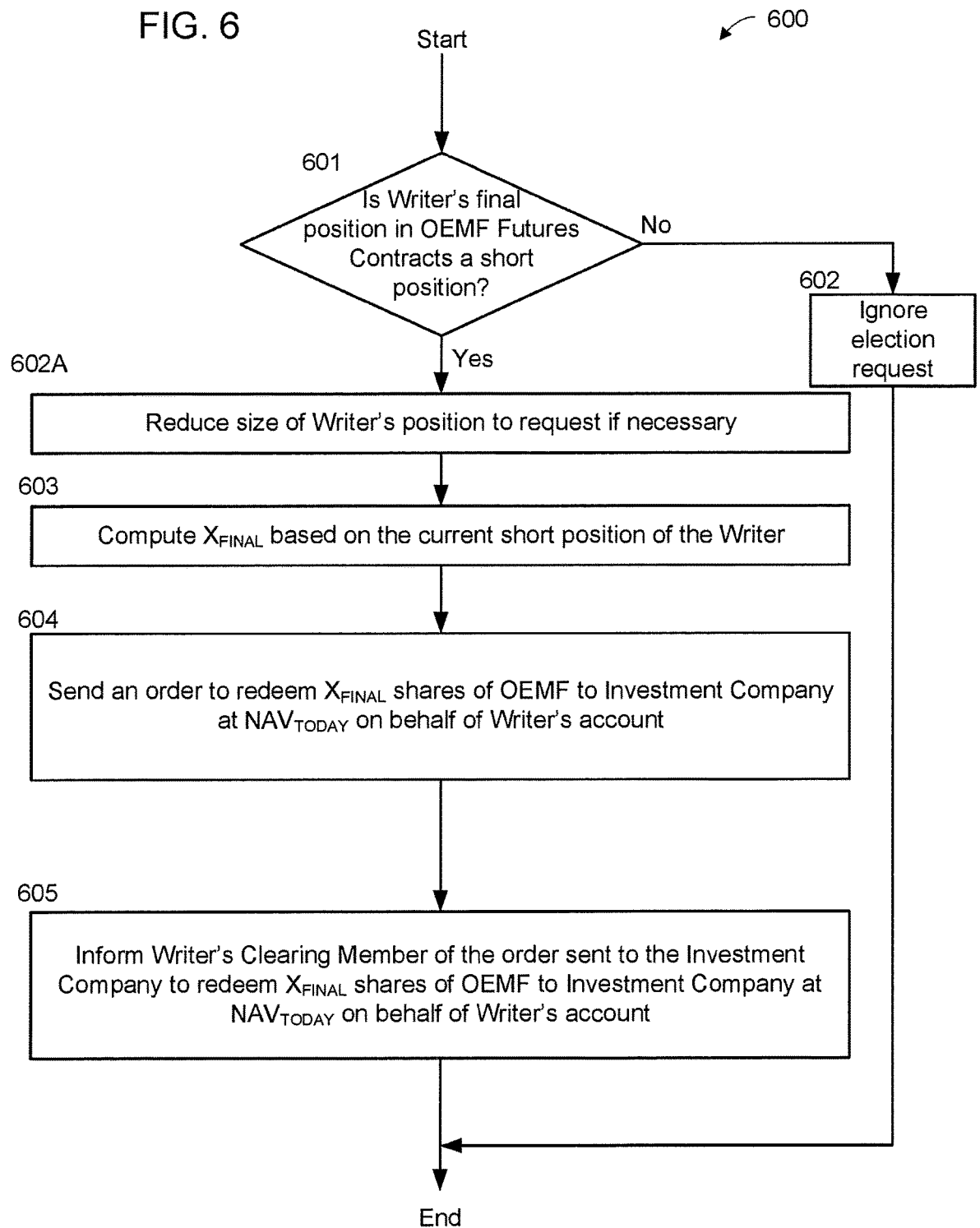
FIG. 6 is a flowchart showing the method and process by which the Clearing Organization processes requests to execute the optional OEMF Futures Physical Settlement after the close of trading in an OEMF Futures Contract on the OEMF Last Trading Date.

FIGS. 5 and 6 are similar to FIGS. 3 and 4, but relate to a Writer's short position, versus a Holder's long position.

FIG. 5 illustrates the processing of an election request for optional OEMF Futures Physical Settlement on receipt of that election request from a Writer of a short position in OEMF Futures Contracts. It shows the method and process by which the Writer of an OEMF Futures Contracts may independently request the Clearing Organization to execute the optional OEMF Futures Physical Settlement prior to the Cutoff Time to Elect Optional Physical Settlement on the OEMF Last Trading Date. This process is the prerequisite to the Clearing Organization executing the optional OEMF Futures Physical Settlement prior to the Cutoff Time to Elect Optional Physical Settlement on the OEMF Last Trading Date. This process 500 begins when a Clearing Member 101 sends a message from its system to a Clearing Organization system 120 through the Clearing Organization's Communication Network 121. The election request message identifies the requesting Clearing Member, the account for which the request is being made, the OEMF Futures Contract for which the request is being made, and the number of OEMF shares which are requesting optional OEMF Futures Physical Settlement. The process 500 begins where the election request is received.

At 501 the Clearing Organization 120 receives and examines the election request for optional OEMF Futures Physical Settlement. The Clearing Organization 120 notes that the election request involves $X_{REQUEST}$ OEMF shares. The OEMF Futures Physical Settlement process permits the Writer of a short position to redeem 100 shares for each short OEMF Futures Contract held at the close of trading on the OEMF Futures Last Trading Date plus an additional oddlot quantity including fractional OEMF shares (if holding of fractional OEMF shares is supported by the Investment Company which manages the OEMF). The oddlot amount, including any fractional shares, must be less than a 100 share round lot. Processing continues at 502.

At 502 the Clearing Organization 120 determines whether the current date is the Cutoff Date to Elect Optional Physical Settlement for the OEMF Futures Contract which is the subject of the election request. Election requests may only be submitted on the Cutoff Date to Elect Optional Physical Settlement. If the current date is not the Cutoff Date to Elect Optional Physical Settlement 502:No, then the election request is premature, and processing continues at 504. Otherwise 502:Yes, processing continues at 503.

At 503 the Clearing Organization 120 determines whether the OEMF Futures Physical Settlement Deadline has passed. This occurs if the current time is at or after the Cutoff Time to Elect Optional Physical Settlement. If the deadline has passed 503:Yes, then the election request is untimely, and processing continues at 504. Otherwise 503:No, processing continues at 507.

At 504 the election request is untimely; it is either not on the Cutoff Date to Elect Optional Physical Settlement or it has been submitted after the OEMF Futures Physical Settlement Deadline has passed. The Clearing Organization rejects the election request. Rejection of the election request is communicated to the Clearing Member which submitted the election request. This is the end of processing of this election request.

At this point, the Clearing Organization 120 has determined that the election request is for a valid OEMF Futures Contract and has been submitted in a timely manner. Processing continues at 507. Any prior election request from the same Clearing Member 101 on behalf of the same account for the same OEMF Futures Contract will be replaced by this subsequent request. An election request for zero OEMF shares will result in cancelling the prior election request. An election request from the same Clearing Member on behalf of the same account for the same OEMF Futures Contract by a Holder of OEMF Futures Contracts (i.e., someone with a short position in OEMF Futures Contracts) will replace any a prior request by the same Clearing Member on behalf of the same account for the same OEMF Futures Contract by a Holder of OEMF Futures Contracts (i.e., someone with a long position in OEMF Futures Contracts). Acceptance of the election request is communicated to the Clearing Member which submitted the election request. This is the end of processing of an election request.

FIG. 6 shows the method and process 600 by which the Clearing Organization 120 processes requests to execute the optional OEMF Futures Physical Settlement after the Cutoff Time to Elect Optional Physical Settlement on the Cutoff Date to Elect Optional Physical Settlement and illustrates the processing of an election request for optional OEMF Futures Physical Settlement from a Holder of a long position in OEMF Futures Contracts which was previously received and accepted by the Clearing Organization (see FIG. 5). This processing is done after the Cutoff Time to Elect Optional Physical Settlement on the Cutoff Date to Elect Optional Physical Settlement because the Holder's final position is required. Processing begins at 600 when this condition has been met.

At 601 the Clearing Organization checks to make sure that the Writer which requested OEMF Futures Physical Settlement still has a short position in OEMF Futures Contracts. This was the case when the election request was accepted by the Clearing Organization (see FIG. 5) and must continue to be the case to proceed. If this is still the case, processing continues at 603. Otherwise processing continues at 602.

At 602 the Writer which requested OEMF Futures Physical Settlement no longer has a short position in OEMF Futures Contracts. OEMF Futures Physical Settlement is not permitted in this case, so the election request is ignored and the Clearing Member 101 is notified that no OEMF Futures Physical Settlement will be effected by the Clearing Organization 102. Processing is now complete.

At 602A, the Writer's request is reduced to the lesser of the request and the current position which permits the Write to have physical settlement of all of the Writer's short position even if the current position is less than the request. At 603 the Writer continues to have a short position in OEMF Futures Contracts. The Clearing Organization 120 must now calculate how many OEMF shares should be processed in response to the OEMF Futures Physical Settlement request. The election request provides the number of OEMF shares that the Writer requests be exchanged through the OEMF Futures Physical Settlement process. Assume that this number ($X_{REQUEST}$) is 7678.321. Fractional shares are permitted to the extent that the Investment Company permits ownership of fractional shares. $X_{REQUEST}$ has two components: a mandatory round lot component and an optional odd lot component. The round lot component is an integer multiple 100 shares the number of OEMF shares underlying each OEMF Futures Contract. The odd lot component is an additional number of OEMF shares—less than OEMF 100 shares which, when added to the round lot component, total $X_{REQUEST}$. In the example above, the election request specified a value of $X_{REQUEST}$ of 7678.321 OEMF shares. The round lot component is 7600 OEMF shares (the equivalent of 76 OEMF Futures Contracts) and the odd lot component is 78.321 OEMF shares. The maximum number of shares which the OEMF Futures Physical Settlement process may handle—$X_{FINAL}$—is the number of OEMF shares covered by the Writer's final short position in OEMF Futures Contract—the position at this time—plus the odd lot component.

Assuming that $X_{REQUEST}$=7678.321

The following table shows $X_{FINAL}$ for various values of the Writer's short position in OEMF Futures Contracts at this time.

TABLE 4

$X_{FINAL}$ for various values of the Writer's short position in OEMF Futures Contracts at this time

| Writer's Short Position at This Time | $X_{FINAL}$ |
|---|---|
| 80 | 7678.321 |
| 79 | 7678.321 |
| 78 | 7678.321 |
| 77 | 7678.321 |
| 76 | 7678.321 |
| 75 | 7578.321 |
| 74 | 7478.321 |
| 73 | 7378.321 |
| ... | ... |
| 1 | 1.321 |

$X_{FINAL}$ is calculated in this manner at this point in the process, and processing continues at 604.

At 604 the Clearing Organization sends an order on behalf of the Writer to redeem $X_{FINAL}$ OEMF shares to the Investment Company. The Investment Company will process this order as part of its normal processing of purchase and redemption orders at the end of the trading day when the Investment Company has calculated the current day's NAV for the OEMF shares. The Investment Company will send the final details of the purchase transaction to the Writer's Clearing Member by way of the Clearing Organization. Processing continues at 605.

At 605 the Clearing Organization informs the Writer's Clearing Member of the order sent at 604. Processing of the submission of the order is complete at this time. The settlement of the transaction can proceed at another time using state of the art systems and methods already used for this purpose.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The invention claimed is:

1. A method for operating an enhanced electronic networked settlement processing system, comprising:

in a networked computer system comprising one or more servers in communication with a member computer associated with an account via a communications network interface, the one or more servers comprising a system processor, a memory, a physical settlement request module, and a physical settlement module, the member computer comprising a graphical user interface (GUI):

creating and storing, by the physical settlement module, open ended mutual fund (OEMF) data related to an OEMF in the memory, the stored OEMF data structured to comprise data related to fund assets and a plurality of fund shares having a value related to the fund assets;

creating and storing, by the physical settlement module, OEMF futures contract (FC) data relating to an OEMF FC in the memory, the OEMF FC data defining: a) a plurality of contract shares of the fund shares, which constitutes a contract size, b) a contract settlement date, and c) contract settlement terms;

receiving, via an input portion of the GUI, user input comprising a request for an election for an optional OEMF FC physical settlement (PS) of a requested number of shares defining a final position;

generating and sending, by the member computer, a first electronic message comprising the request to the one or more servers via the communications network interface;

receiving, by the one or more servers via the communications network interface, the first electronic message from the member computer;

upon determining, by the physical settlement request module that the first electronic message is timely and the requested number of shares defining the final position is within a predetermined range of number of shares;

generating and sending, by the physical settlement request module, an electronic order to redeem the requested number of shares to a third party computer system, generating and sending, by the physical settlement request module via the communications network interface, a second electronic message to the member computer the second electronic message comprising information relating to the electronic order, and displaying, via a display portion of the GUI, the information relating to the electronic order; and upon determining, by the physical settlement request module, that the first electronic message is untimely and the requested number of shares defining the final position is outside the predetermined range of number of shares:
  ignoring and terminating, by the physical settlement request module, the request,
  generating and sending, by the physical settlement request module via the communications network interface, an electronic rejection message to the member computer, and
  displaying, via the display portion of the GUI, the electronic rejection message.

2. The method of claim 1, wherein when the first electronic message is determined to be timely, the method further comprises:
  accepting the request for the election which supersedes any prior election request for a same FC for the account.

3. The method of claim 1, wherein when the requested number of shares defining the final position is determined to be within the predetermined range of number of shares, the method further comprises:
  reducing a size of the requested number of shares if said size is larger than a size of a current position; and
  computing a maximum number of shares that the OEMF FC PS may handle as the final number of OEMF shares covered by the final position in the OEMF FC.

4. The method of claim 1, wherein the final position comprises a long position.

5. The method of claim 1, wherein the account is associated with a writer and the final position comprises a short position.

6. The method of claim 1, wherein the requested number of shares accommodates both a mandatory round lot component and an optional odd lot component.

7. A non-transitory computer-readable storage medium for operating an enhanced electronic networked settlement processing system, the non-transitory computer-readable storage medium storing program instructions that, when executed by one or more processors, cause the one or more processors to perform the functions of:
  in a networked computer system comprising one or more servers in communication with a member computer associated with an account via a communications network interface, the one or more servers comprising a system processor, a memory, a physical settlement request module, and a physical settlement module, the member computer comprising a graphical user interface (GUI):
  creating and storing, by the physical settlement module, open ended mutual fund (OEMF) data related to an in the memory, the stored OEMF data structured to comprise data related to fund assets and a plurality of fund shares having a value related to the fund assets;
  creating and storing, by the physical settlement module, OEMF futures contract (FC) data relating to an OEMF FC in the memory, the FC data defining: a) a plurality of contract shares of the fund shares, which constitutes a contract size b) a contract settlement date, and c) contract settlement terms;
  receiving, via an input portion of the GUI, user input comprising a request for an election for an optional FC physical settlement (PS) of a requested number of shares defining a final position;
  generating and sending, by the member computer via the communications network interface, a first electronic message comprising the request;
  receiving, by the one or more servers via the communications network interface, the first electronic message from the member computer;
  upon determining, by the physical settlement request module, at least one of: whether that the first electronic message is timely and the requested number of shares defining the final position is within a predetermined range of number of shares;
    generating and sending, by the physical settlement request module, an electronic order to redeem the requested number of shares to a third party computer system,
    generating and sending, by the physical settlement request module via the communications network interface, a second electronic message to the member computer, the second electronic message comprising information relating to the electronic order, and
    displaying, via a display portion of the GUI, the information relating to the electronic order; and
  upon determining, by the physical settlement request module, that the first electronic message is untimely and the requested number of shares defining the final position is outside the predetermined range of number of shares:
    ignoring and terminating, by the physical settlement request module, the request,
    generating and sending, by the physical settlement request module via the communications network interface, an electronic rejection message to the member computer, and
    displaying, via the display portion of the GUI, the electronic rejection message.

8. The non-transitory computer-readable storage medium of claim 7, wherein when the first electronic message is determined to be timely, the program instructions further cause the one or more processors to perform the functions of:
  accepting the request for the election which supersedes any prior election request for a same OEMF FC for the account.

9. The non-transitory computer-readable storage medium of claim 7, wherein when the requested number of shares defining the final position is determined to be within the predetermined range of number of shares, the program instructions further cause the one or more processors to perform the functions of:
  reducing a size of the requested number of shares if said size is larger than a size of a current position; and
  computing a maximum number of shares that the OEMF FC PS may handle as the final number of OEMF shares covered by the final position in the OEMF FC.

10. The non-transitory computer-readable storage medium of claim 7, wherein the final position comprises a long position.

11. The non-transitory computer-readable storage medium of claim 7, wherein the account is associated with a writer and the final position comprises a short position.

12. The non-transitory computer-readable storage medium of claim 7, wherein the requested number of shares accommodates both a mandatory round lot component and an optional odd lot component.

13. A system for operating an enhanced electronic networked settlement processing system, comprising:
  one or more servers in communication with a member computer associated with an account via a communications network interface, the one or more servers comprising a system processor, a memory, a physical settlement request module, and a physical settlement module, the member computer comprising a graphical user interface (GUI), the memory storing program instructions that, when executed by the system processor, cause the system to:

create and store, by the physical settlement module, open ended mutual fund (OEMF) data related to an OEMF in the memory, the stored OEMF data structured to comprise data related to fund assets and a plurality of fund shares having a value related to the fund assets;

create and store, by the physical settlement module, OEMF futures contract (FC) data relating to an FC in the memory, the OEMF FC data defining: a) a plurality of contract shares of the fund shares, which constitutes a contract size, b) a contract settlement date, and c) contract settlement terms;

receive, via an input portion of the GUI, user input comprising a request for an ELECTION FOR AN OPTIONAL OEMF FC PHYSICAL SETTLEMENT (PS) OF A REQUESTED NUMBER OF SHARES defining a final position;

generate and send, by the member computer via the communications network interface, a first electronic message comprising the request to the one or more servers via the communications network interface;

receive, by the one or more servers via the communications network interface, the first electronic message from the member computer;

upon determining, by the physical settlement request module that the first electronic message is timely and the requested number of shares defining the final position is within a predetermined range of number of shares;

generating and sending, by the physical settlement request module, an electronic order to redeem the requested number of shares to a third party computer system, generating and sending, by the physical settlement request module, a second electronic message to the member computer, the second electronic message comprising information relating to the electronic order, and displaying, via a display portion of the GUI, the information relating to the electronic order; and upon determining, by the physical settlement request module, that the first electronic message is untimely and the requested number of shares defining the final position is outside the predetermined range of number of shares:

ignoring and terminating, by the physical settlement request module, the request, generating and sending, by the physical settlement request module, an electronic rejection message to the member computer, and displaying, via the display portion of the GUI, the electronic rejection message.

14. The system of claim 13, wherein when the first electronic message is determined to be timely, the program instructions, when executed by the system processor, further cause the system to:

accept the request for the election which supersedes any prior election request for a same OEMF FC for the account.

15. The system of claim 13, wherein when the requested number of shares defining the final position is determined to be within the predetermined range of number of shares, the program instructions, when executed by the system processor, further cause the system to:

reduce a size of the requested number of shares if said size is larger than a size of a current position; and compute a maximum number of shares that the OEMF FC PS may handle as the final number of OEMF shares covered by the final position in the OEMF FC.

16. The system of claim 13, wherein the final position comprises a long position.

17. The system of claim 13, wherein the account is associated with a writer and the final position comprises a short position.

18. The system of claim 13, wherein the requested number of shares accommodates both a mandatory round lot component and an optional odd lot component.

* * * * *